United States Patent
Lee et al.

(10) Patent No.: US 9,761,039 B2
(45) Date of Patent: Sep. 12, 2017

(54) METHOD AND APPARATUS FOR HYBRID RENDERING

(71) Applicant: Samsung Electronics Co., Ltd., Suwon-si (KR)

(72) Inventors: Wonjong Lee, Seoul (KR); Youngsam Shin, Hwaseong-si (KR); Jaedon Lee, Yongin-si (KR); Seokjoong Hwang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 92 days.

(21) Appl. No.: 14/665,099

(22) Filed: Mar. 23, 2015

(65) Prior Publication Data

US 2016/0027203 A1 Jan. 28, 2016

(30) Foreign Application Priority Data

Jul. 22, 2014 (KR) ........................ 10-2014-0092658

(51) Int. Cl.
*G06T 15/40* (2011.01)
*G06T 15/00* (2011.01)
(Continued)

(52) U.S. Cl.
CPC ............ *G06T 15/005* (2013.01); *G06T 11/40* (2013.01); *G06T 15/06* (2013.01)

(58) Field of Classification Search
None
See application file for complete search history.

(56) References Cited

U.S. PATENT DOCUMENTS

| 8,379,022 B2 | 2/2013 | Tavenrath |
| 2011/0170756 A1* | 7/2011 | Schneider ............... G06T 15/08 382/131 |
| 2014/0063016 A1 | 3/2014 | Howson et al. |

FOREIGN PATENT DOCUMENTS

| JP | 11-328447 A | 11/1999 |
| KR | 10-2009-0065353 A | 6/2009 |

(Continued)

OTHER PUBLICATIONS

Sabino, T., Andrade, P., Clua, E., Montenegro, A., Pagliosa, P., A Hybrid GPU Rasterized and Ray Traced Rendering Pipeline for Real Time Rendering of Per Pixel Effects, Sep. 2012, ICEC '12 Proceedings of the 11th international conference on Entertainment Computing, pp. 292-305.*

(Continued)

*Primary Examiner* — Said Broome
(74) *Attorney, Agent, or Firm* — Harness, Dickey & Pierce, P.L.C.

(57) ABSTRACT

A hybrid rendering method includes subdividing a two-dimensional (2D) frame into virtual tiles (hereinafter, referred to as 'tiles'); classifying the tiles into first tiles which include an object having reflective or transparent properties and second tiles which do not include the object having reflective or transparent properties; storing geometric information of a primitive in the first tiles in a graphics processing unit (GPU) internal memory; and generating a first image by rendering one or more of the first tiles via ray tracing using the geometric information, generating a second image by rendering one or more of the second tiles via rasterization, and outputting a final image by merging the first and second images.

17 Claims, 8 Drawing Sheets

(51) Int. Cl.
*G06T 15/06* (2011.01)
*G06T 11/40* (2006.01)

(56) References Cited

FOREIGN PATENT DOCUMENTS

| | | |
|---|---|---|
| KR | 10-2009-0096750 A | 9/2009 |
| KR | 10-2010-0132605 A | 12/2010 |

OTHER PUBLICATIONS

Leclerc, Yvan G., and Stephen Q. Lau. "TerraVision: A Terrain Visualization System," SRI International, *Technical Note* 540 (1994). (20 pages, in English) Menlo Park, CA.

Wald, Ingo, et al. "Interactive Ray Tracing on Commodity PC Clusters," Euro-Par 2003 *Parallel Processing.* Springer Berlin Heidelberg, 2003, 499-508. (10 pages, in English) Saarland University, Germany.

\* cited by examiner

METHOD AND APPARATUS FOR HYBRID RENDERING

CROSS REFERENCE TO RELATED APPLICATION

This application claims the benefit under 35 USC 119(a) of Korean Patent Application No. 10-2014-0092658, filed on Jul. 22, 2014, in the Korean Intellectual Property Office, the disclosure of which is incorporated herein in its entirety by reference.

BACKGROUND

Field

The present description relates to methods and apparatuses for hybrid rendering, and more particularly, to a method and apparatus for hybrid rendering which effectively combine rasterization and ray tracing rendering techniques based on subdivision of virtual tiles.

Description of Related Art

Rasterization and ray tracing are two representative rendering approaches. In rasterization, an image is generated by projecting a three-dimensional (3D) model onto a screen. Ray tracing is a rendering technique for generating an image by tracing a path of light incident along a ray that is emitted form a viewpoint of a camera toward each pixel of an image.

Ray tracing rendering is also capable of producing a high quality image by simulating physical properties of light such as reflection, refraction, transmission, etc.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Provided are methods and apparatuses for hybrid rendering that combine ray tracing rendering and rasterization rendering, which are adapted to prevent unnecessary access to a memory that is external to a graphics processing unit (GPU).

Additional aspects will be set forth in part in the description which follows and, in part, will be apparent from the description, or may be learned by practice of the presented exemplary embodiments.

According to one general aspect, a hybrid rendering method includes subdividing a two-dimensional (2D) frame into virtual tiles (hereinafter, referred to as 'tiles'), classifying the tiles into first tiles including an object having reflective or transparent properties and second tiles lacking an object having reflective or transparent properties; and generating a first image by rendering one or more of the first tiles via ray tracing using geometric information of a primitive of the first tiles, generating a second image by rendering one or more of the second tiles via rasterization, and outputting a final image by merging the first and second images.

The classifying of the tiles may include: extracting properties of primitives in the tiles; and determining, among the tiles, a tile including a primitive having one of a reflectivity and a refractive index greater than 0 as the first tile, by using the extracted properties of the primitives.

The extracting of the properties of the primitives may include: performing binning to determine a tile in which each of the primitives is included from among the tiles; generating information about mapping between the respective tiles and the primitives; and acquiring a list of the primitives in each of the tiles by using the mapping information, to extract properties of the primitives in the list of primitives.

The geometric information of the primitive of the first tiles may include at least one of depth information, a normal vector, and position information of the primitive of the first tiles.

The method further includes storing the geometric information of the primitive of the first tiles: fetching the geometric information of the primitive of the first tiles from a GPU external memory; and copying the fetched geometric information into the GPU internal memory.

The geometric information of the primitive of the first tiles may include at least one of depth information, a normal vector, and position information of the primitive, and the GPU external memory may be a G-buffer.

The hybrid rendering method may further include: creating a tile list including a classification result; and converting a primitive of the first tiles into a fragment by reading the tile list. In the storing of the geometric information, the classification result may be used.

According to another aspect, a hybrid rendering apparatus includes: a tile subdivision unit configured to subdivide a two-dimensional (2D) frame into tiles; a tile classification unit configured to classify the tiles into first tiles which include an object having reflective or transparent properties and second tiles lacking the object having reflective or transparent properties; a fetching unit configured to store geometric information of a primitive in the first tiles in a GPU internal memory; and a rendering unit configured to generate a first image by rendering one or more of the first tiles via ray tracing using the geometric information, to generate a second image by rendering one or more of the second tiles via rasterization, and to output a final image by merging the first and second images.

The tile classification unit may extract properties of primitives in the tiles and determine, among the tiles, a tile including a primitive having one of a reflectivity and a refractive index greater than 0 as the first tile by using the extracted properties of the primitives.

The tile classification unit may include: a mapping unit configured to perform binning to determine a tile in which each of the primitives is included from among the tiles and to generate information about mapping between the respective tiles and the primitives; and a determination unit configured to acquire a list of the primitives in each of the tiles by using the mapping information, extract properties of the primitives in the list of primitives, and to determine, among the tiles, a tile including at least one primitive having one of a reflectivity and a refractive index greater than 0 as the first tile, by using the properties of the primitives.

The geometric information may include at least one of depth information, a normal vector, and position information of the primitive.

The rendering via ray tracing may be performed together with shading in a device for performing the shading.

The fetching unit may fetch geometric information of the primitive from a GPU external memory and copy the fetched geometric information into the GPU internal memory.

The geometric information may include at least one of depth information, a normal vector, and position information of the primitive, and the GPU external memory may be a G-buffer.

The hybrid rendering apparatus may further include a rasterizer, and the tile classification unit may create a tile list including a classification result. The rasterizer may convert a primitive in the tiles into a fragment by reading the tile list, and the fetching unit may use the classification result contained in the tile list.

According to an aspect of another exemplary embodiment, a non-transitory computer-readable recording medium has recorded thereon a program for executing the hybrid rendering method on a computer.

The method and apparatus for hybrid rendering according to the exemplary embodiments utilize rasterization and ray tracing rendering to reduce access to a GPU external memory.

Other features and aspects will be apparent from the following detailed description, the drawings, and the claims.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Three-dimensional (3D) rendering refers to an image processing process for synthesizing 3D model data into an image that may be seen at a given viewpoint of a camera. Rendering methods are classified into a rasterization technique for generating an image by projecting a 3D model onto a screen and a ray tracing technique for generating an image by tracing a path of light incident along a ray that is emitted from a viewpoint of a camera toward each pixel of an image.

Figure 1:
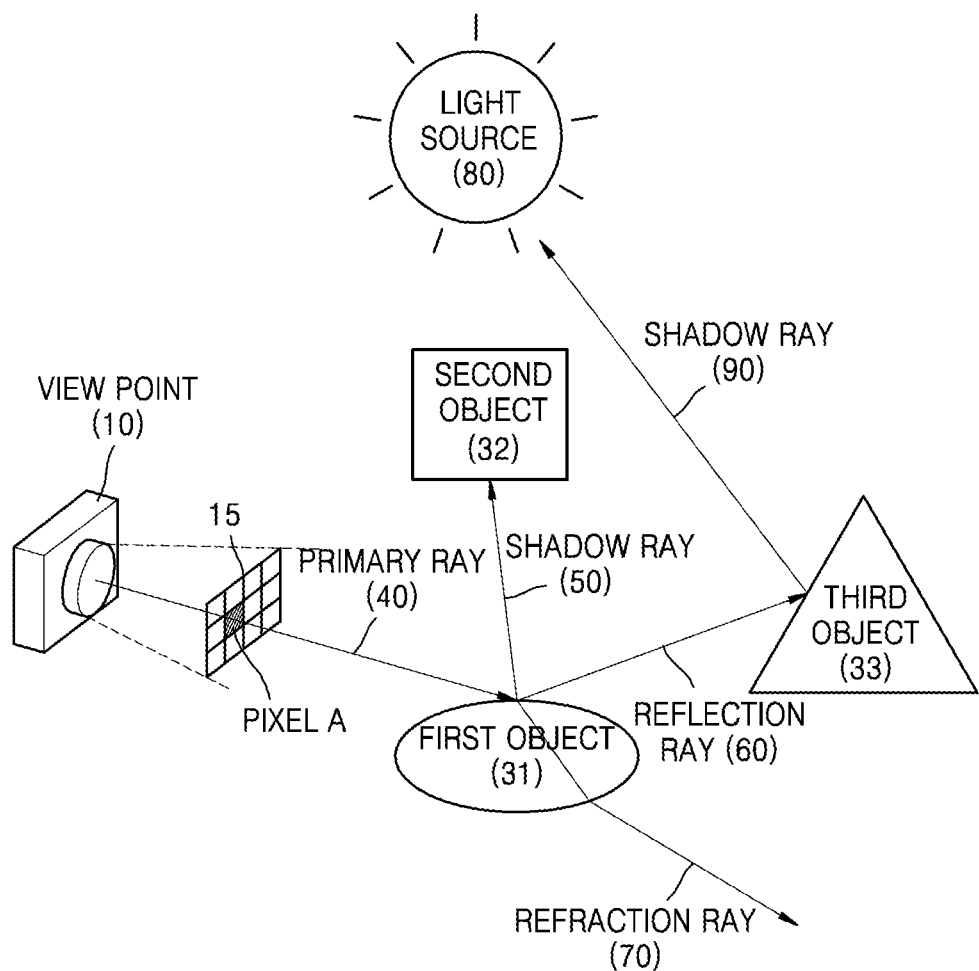
FIG. 1 is a diagram for explaining a ray tracing rendering method.

FIG. 1 is a diagram for explaining a ray tracing rendering method. Although first through third objects 31 through 33 are represented as two-dimensional (2D) objects, this representation is for convenience of explanation and thus not limited thereto. The first through third objects 31 through 33 may be 3D model data.

In FIG. 1, the first object 31 has reflective or transparent properties and has a reflectivity and a refractive index greater than 0. The second and third objects 32 and 33 do not have reflective nor transparent properties and have a reflectivity and a refractive index of 0. In other words, the first object 31 reflects and refracts light while the second and third objects 32 and 33 do not reflect nor refract light.

Referring to FIG. 1, in 3D modelling, a rendering apparatus (e.g., a ray tracing rendering apparatus) determines a view point 10 for generating a 3D image and determines a screen 15 according to the view point 10. When the view point 10 and the screen 15 are determined, the ray tracing rendering apparatus generates a ray for each fragment in the screen 15 from the view point 10. For example, if the resolution of the screen 15 is 4*3 as shown in FIG. 1, rays are generated for 12 pixels. Hereinafter, for illustrative purposes, only a ray for one fragment (i.e., pixel (pixel A)) is now described.

Referring to FIG. 1, a primary ray 40 is generated from the view point 10 through the pixel A. The primary ray 40 then passes through a 3D space before reaching the first object 31. In this case, the first object 31 is composed of a set of unit regions called primitives. For example, a primitive is a polygon such as a triangle or a rectangle, but the primitive is not limited thereto. In one example, it is assumed hereinafter that a primitive is a triangle.

A shadow ray 50, a reflection ray 60, and a refraction ray 70 may be generated using a hit point between the primary ray 40 and the first object 31. In this case, the shadow ray 50, the reflection ray 60, and the refraction ray 70 are called secondary rays. The shadow ray 50 is also emitted from the hit point toward the second object 32. The reflection ray 60 is generated in a direction determined by an angle of incidence of the primary ray 40, and a weight is set by a reflectivity of the first object 31 and is applied to the reflection ray 60. The refraction ray 70 is generated in a direction determined by the angle of incidence of the primary ray 40 and a refractive index of the first object 31.

A ray tracing rendering apparatus determines whether a hit point is exposed to the light source 80 via the shadow ray 50. For example, as shown in FIG. 1, if the shadow ray 50 encounters the second object 32, a shadow is formed at a hit point where the shadow ray 50 is produced. Furthermore, the ray tracing rendering apparatus determines whether the refraction ray 70 and the reflection ray 60 may reach another object. For example, as shown in FIG. 1, no object is placed in the direction of propagation of the refraction ray 70, and the reflection ray 60 may reach the third object 33. When the reflection ray 60 hits the third object 33, the ray tracing rendering apparatus determines coordinates and color information of a hit point of the third object 33 and generates a shadow ray 90 from the hit point of the third object 33. In this case, the ray tracing rendering apparatus determines whether the shadow ray 90 is exposed to the light source 80. In addition, since the reflectivity and refractive index of the third object 33 is 0, a reflection ray and a refraction ray are not generated for the third object 33.

As described above, the ray tracing rendering apparatus analyzes the primary ray 40 for the pixel A and all rays derived from the primary ray 40 and determines a color value of the pixel A according to an analysis result. The determination of the color value of the pixel A is affected by colors of hit points of the primary ray 40 and reflection ray 60 and whether the shadow ray 50 reaches the light source. The ray tracing rending apparatus may construct the screen 15 by performing the above-described process on all pixels in the screen 15 to construct the screen 15.

As described above, a rendering technique for tracing a path of ray data represented by a view point and a direction is called ray tracing rendering, and a rendering technique for generating an image by projecting a 3D model onto a screen is called rasterization rendering.

Figure 2:
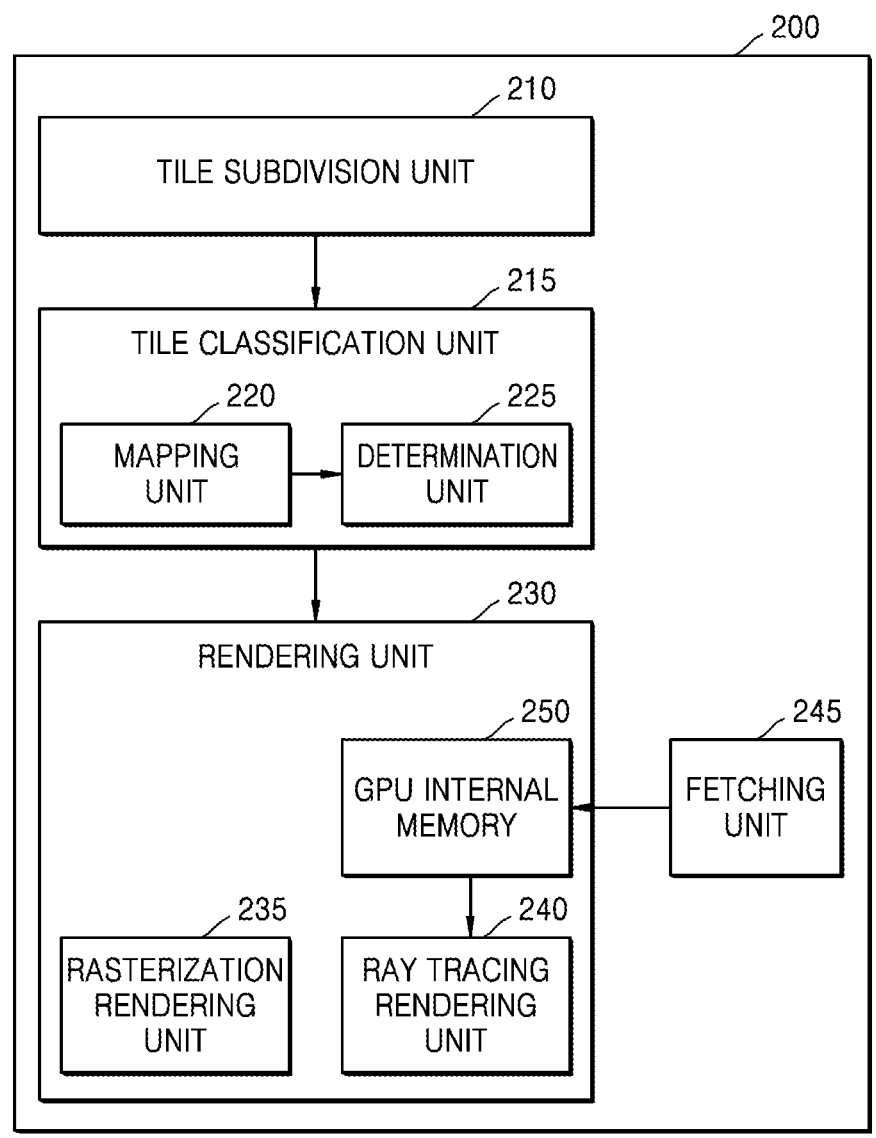
FIG. 2 is a block diagram of a configuration of a hybrid rendering apparatus according to an embodiment.

FIG. 2 is a block diagram of a configuration of a hybrid rendering apparatus according to an embodiment.

Referring to FIG. 2, the hybrid rendering apparatus 200 includes a tile subdivision unit 210, a tile classification unit 215, a fetching unit 245, and a rendering unit 230.

The tile subdivision unit 210 subdivides a 2D frame (310 of FIG. 3) into a plurality of virtual tiles (hereinafter, referred to as 'tiles'). Tiles refer to regions obtained by virtually subdividing a 2D frame. The tile subdivision unit 210 outputs the tiles to the tile classification unit 215. The second frame 310 is a display region or 2D image, but is not limited thereto.

The tile classification unit 215 includes a mapping unit 220 and a determination unit 225. The mapping unit 220 generates information about mapping between tiles and primitives by performing a binning operation to determine a tile in which each primitive in an object is included from among the tiles output by the tile classification unit 215.

The determination unit 225 determines whether each of the tiles is a first tile including an object having reflective or transparent properties or a second tile not including an object having reflective or transparent properties.

The determination unit 225 extracts properties of primitives included in tiles and classifies a tile including at least one primitive having one of a reflectivity and a refractive index greater than 0 as a first tile. The determination unit 225 also classifies a tile that is not classified as the first tile as a second tile. The properties of primitives include material properties such as reflectivities and refractive indices thereof, but are not limited thereto.

To extract properties of a list of primitives included in each tile, the determination unit 225 acquires the list of primitives in the tile by using information about mapping between tiles and primitives that is generated by the mapping unit 220. A tile is classified as a first or second tile by using a flag such as a Boolean value. Alternatively, a tile is classified by creating a field such as a "tile type" in identification (ID) information of the tile and specifying the field as a character string.

The tile classification unit 215 creates a first tile group including one or more first tiles and a second tile group including one or more second tiles in order to manage tiles. Tiles in the first tile group and in the second tile group may be referred to as first and second tiles, respectively. Before the rendering unit 230 starts rendering using a ray tracing method, the fetching unit 245 stores geometric information of primitives included in a first tile, which is needed for ray tracing rendering, in a graphics processing unit (GPU)'s internal memory 250.

The geometric information needed for ray tracing rendering is stored in a GPU external memory, and the fetching unit 245 fetches the geometric information stored in the GPU external memory and copies the geometric information into the GPU internal memory 250. Since the geometric information is stored in the GPU internal memory 250 before the rendering unit 230 starts rendering, the number of times the GPU external memory is accessed may be decreased. Thus, power consumption may be reduced, and a memory bandwidth problem may be solved.

The GPU internal memory 250 includes a static random-access memory (SRAM) or cache memory, and may also include an on-chip buffer. The geometric information may be depth information, normal vectors, and position information of primitives.

A rasterization rendering unit 235 renders second tiles using rasterization to generate a second image, and the ray tracing rendering unit 240 renders first tiles using ray tracing to produce a first image. The rendering unit 230 merges the first and second images together to create a final image.

Figure 3:
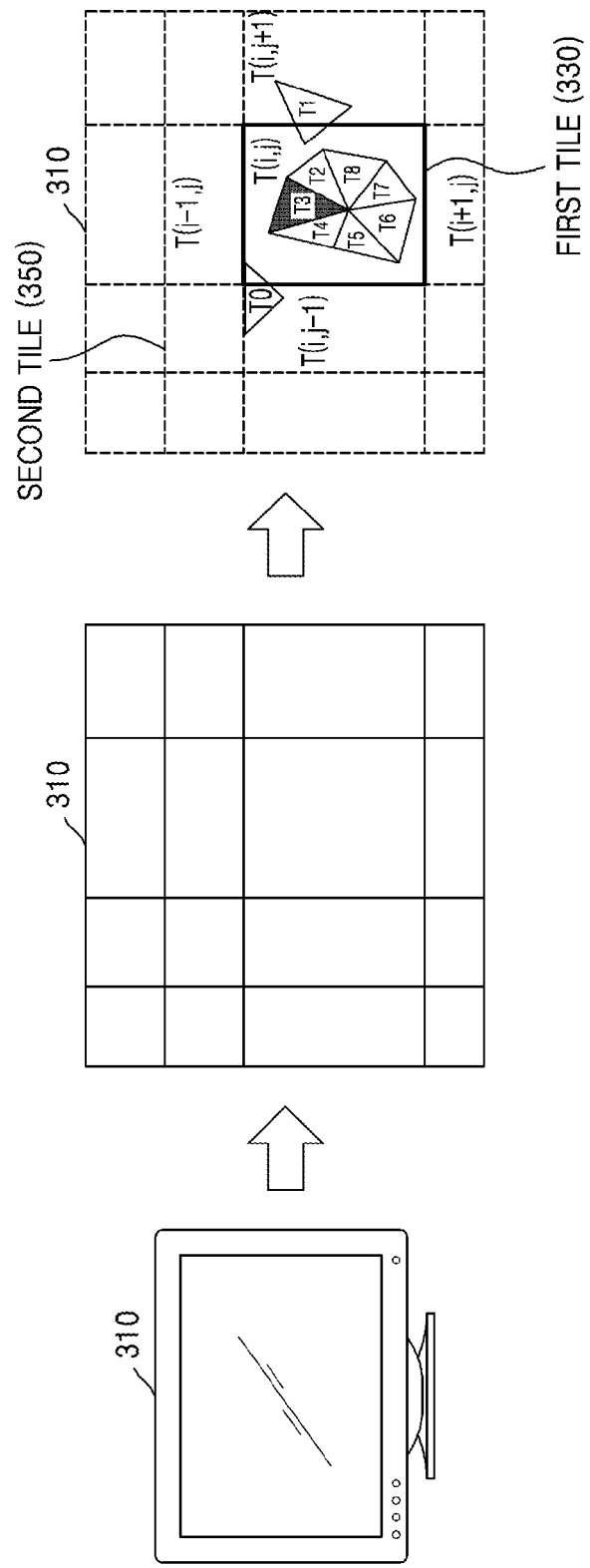
FIG. 3 is a diagram for explaining subdivision of a two-dimensional (2D) frame into a plurality of tiles and classification of the tiles, according to an embodiment.

FIG. 3 is a diagram for explaining subdivision of a 2D frame into a plurality of tiles and classification of the tiles, according to an embodiment.

The 2D frame 310 is a display region or 2D image, but is not limited thereto.

Referring to FIGS. 2 and 3, the tile subdivision unit 210 subdivides the 2D frame 310 into virtual tiles (hereinafter, referred to as 'tiles').

The determination unit 225 classifies the tiles obtained by the tile subdivision unit 210 into first tiles that include an object having reflective or transparent properties 330 and second tiles 350 that does not include an object having reflective or transparent properties. Among the tiles, the first and second tiles 330 and 350 are indicated by a solid line or a dotted line, respectively.

The determination unit 225 extracts properties of primitives included in each of the tiles and determines tiles, including at least one primitive having a reflectivity or refractive index greater than 0, as first tiles. The determination unit 225 performs this determination by using the extracted properties of the primitives. The determination unit 225 also determines tiles that are not classified as the first tiles as second tiles. The extracted properties of primitives include material properties such as reflectivity and refractive index, but are not limited thereto.

To extract the properties of primitives included in each of the tiles, the determination unit 225 acquires a list of primitives in the tile by using mapping information. The mapping information includes information between tiles and primitives that is generated by the mapping unit 220.

A tile may be classified as a first or second tile by using a flag such as a Boolean value. Alternatively, a tile may be classified as a first or second tile by creating a field such as a "tile type" in ID information of the tile and specifying the field as a character string. For example, ID information of a tile T(i,j) 330 includes a unique ID for identifying the tile T(i,j) 330, information about whether the tile T(i,j) 330 is the first tile, and a list of primitives $T_0$ to $T_8$ included in the tile T(i. j) 330.

In the 2D frame 310, a plurality of tiles T(i, j) and T(i, j+1) (i and j are positive numbers) may include one primitive $T_1$, or one tile T(i, j) 330 may include a plurality of primitives.

Among the primitives $T_0$ to $T_8$ in the tile T(i, j) 330, primitive $T_3$ may have a reflective or transparent properties like a minor or water. Since the mirror or water has a reflectivity or refractive index greater than 0, the primitive $T_3$ may be determined as a primitive having reflective or transparent properties, and thus, the entire tile T(i, j) containing the primitive $T_3$ may be determined as a first tile including an object having reflective or transparent properties.

Figure 4:
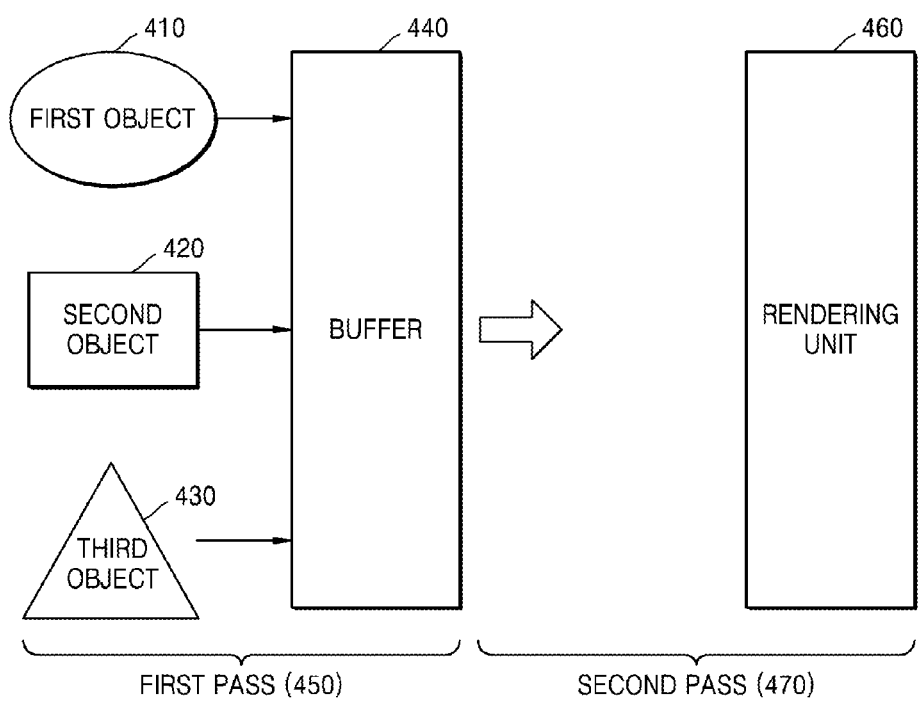
FIG. 4 is a block diagram of a configuration of a deferred rendering apparatus according to an embodiment.

FIG. 4 is a block diagram of a configuration of a deferred rendering apparatus according to an embodiment.

A deferred rendering apparatus using multi-pass rendering may be obvious to those of ordinary skill in the art.

Deferred rendering is a technique for avoiding inefficiency due to duplicate calculations by performing shading calculations on only a fragment that is actually rendered on a screen. Deferring rendering may be used in mobile devices where power consumption and system bandwidth are critical factors.

In a first pass 450, geometric information of several objects, e.g., first object 410, second object 420 and third object 430, to be rendered is stored before rendering is performed. In a second pass 470, rendering is performed in the rendering unit 460 using the geometric information generated in the first pass 450.

In the first pass 450, rendering for determining a color of a fragment is not performed but geometric information needed for the rendering, such as depths, normal vectors, and positions of primitives that construct an object, is stored in a separate buffer 440. The separate buffer 440 may be a G-buffer in a GPU external memory widely known to those of ordinary skill in the art.

In the second pass 470, rendering is performed using the geometric information generated in the first pass 450. In this case, shading is performed on only a fragment that is actually rendered on a screen to determine a color of the fragment. In other words, a hit point between a primary ray and an object is calculated using the geometric information generated in the first pass 450, and secondary rays, i.e., the reflection ray (60 in FIG. 1), the refraction ray (70 in FIG. 1), and the shadow ray (90 in FIG. 1) are generated via the calculated hit point.

Thus, to combine a GPU based on conventional rasterization rendering with ray tracing rendering, use of the geometric information stored in the buffer 440 may be considered.

Figure 5:
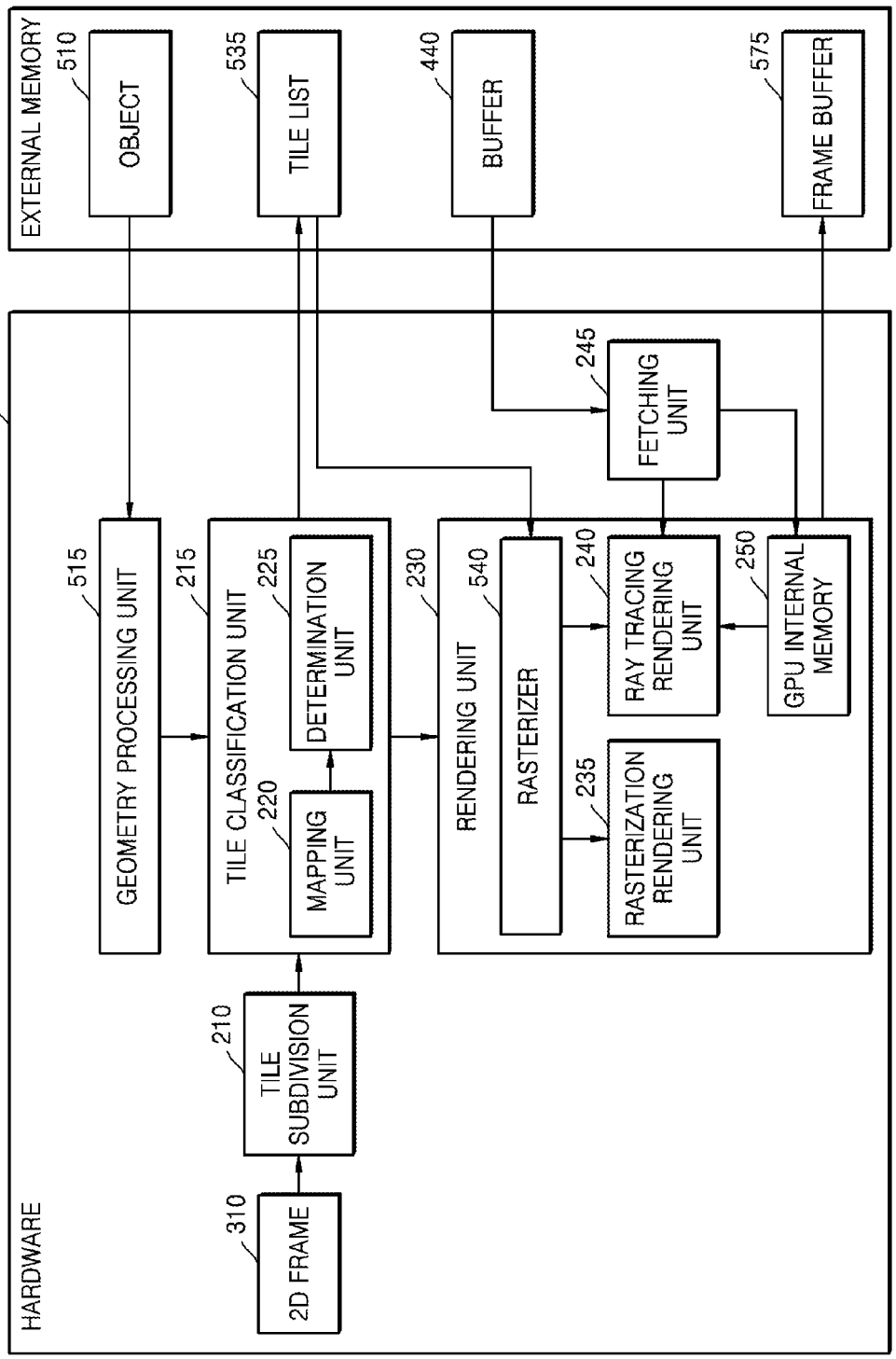
FIG. 5 is a block diagram of a configuration of a detailed example of a hybrid rendering apparatus according to an embodiment.

FIG. 5 is a block diagram of a configuration of an example of a hybrid rendering apparatus of FIG. 2.

Thus, although omitted hereinafter, the above descriptions with respect to FIG. 2 are applied to the hybrid rendering apparatus 200 of FIG. 5.

The hybrid rendering apparatus of FIG. 5 is configured to reduce the number of times an external memory is accessed in order to retrieve geometric information needed for ray tracing rendering, thereby reducing power consumption and eliminating a memory bandwidth problem.

Referring to FIG. 5, a geometry processing unit 515 creates a list of primitives for an object 510 and outputs the list of primitives to a tile classification unit 215. A tile subdivision unit 210 subdivides a 2D frame 310 into virtual tiles and outputs the virtual tiles (hereinafter, referred to as 'tiles') to the tile classification unit 215. The 2D frame 310 may be a display region or 2D image, but is not limited thereto.

The tile classification unit 215 includes a mapping unit 220 and a determination unit 225.

The mapping unit 220 may generate information about mapping between tiles and primitives by performing a binning operation to determine a tile in which each primitive in the object 510 is included from among the tiles output by the tile subdivision unit 210

The determination unit 225 determines whether each of the tiles is a first tile including an object having reflective or transparent properties or a second tile not including an object having reflective or transparent properties.

The determination unit 225 extracts properties of primitives included in tiles. The properties of the primitives include material properties such as reflectivities and refractive indices thereof. The determination unit 225 also classifies a tile including at least one primitive having one of a reflectivity and a refractive index greater than 0 as a first tile. The determination unit 225 further classifies a tile that is not classified as the first tile as a second tile. The properties of primitives include material properties such as reflectivities and refractive indices thereof, but are not limited thereto.

To extract properties of the list of primitives included in each tile, the determination unit 225 acquires the list of primitives in the tile by using information about mapping between tiles and primitives that is generated by the mapping unit 220.

A tile may be classified as a first or second tile by using a flag such as a Boolean value. Alternatively, a tile is classified as a first or second tile by creating a field such as a "tile type" in identification (ID) information of the tile and specifying the field as a character string.

The tile classification unit 215 creates a first tile group consisting of one or more first tiles and a second tile group consisting of one or more second tiles in order to manage tiles. Tiles in the first tile group and in the second tile are referred to as first and second tiles, respectively. The tile classification unit 215 also creates a tile list 535 containing mapping information and the result of classification. For example, the tile list 535 includes ID information of each tile, and the ID information of each tile contains a unique ID for identifying the tile, information about whether the tile is classified as the first tile, and a list of primitives included in the tile. The tile list 535 also includes coordinate information of a vertex of each primitive and property information of each primitive.

While reading the tile list 535, a rasterizer 540 determines whether each tile in the tile list 535 being read is the first tile by using classification information contained in the tile list 535. According to one exemplary embodiment, while reading the tile list 535 stored in a GPU external memory, the rasterizer 540 transmits ID information of tiles that are classified as the first tile to a fetching unit 245 by referring to a flag in classification information.

Before a rendering unit 230 starts rendering using a ray tracing method, the fetching unit 245 stores geometric information of primitives included in the first tile, which is needed for ray tracing rendering, in a GPU internal memory 250.

The geometric information needed for ray tracing rendering is stored in the GPU external memory, and the fetching unit 245 fetches the geometric information stored in the GPU external memory and copies the geometric information into the GPU internal memory 250. The GPU internal memory 250 includes a SRAM or cache memory, and may also include an on-chip buffer. The geometric information may be depth information, normal vectors, and position information of primitives.

According to an embodiment, rendering is performed using a deferred rendering technique. As described above, to perform shading on fragments that are actually rendered on a screen, deferred rendering includes a first stage of storing geometric information of an object in a 3D space and a second stage of performing rendering by using the geometric information stored in the first stage. In one illustrative example, shading is performed only on fragments that are actually rendered on a screen. Thus, before ray tracing rendering starts, the fetching unit 245 fetches geometric information of the primitives in a first tile, which is stored in the first stage, from a buffer 440 and copies the geometric information into the GPU internal memory 250.

While the rasterizer 540 reads the tile list 535 and converts primitives into fragments, the fetching unit 245 stores geometric information in the GPU internal memory 250. However, it is noted that converting primitives into fragments and storing of the geometric information are not necessarily performed simultaneously. The geometric information is stored in the GPU internal memory 250 at any time before generation of secondary rays for fragments to be rendered.

The rasterizer 540 outputs a fragment in the first tile and a fragment in the second tile to a rasterization rendering unit 235 and a ray tracing rendering unit 240, respectively.

The rasterization rendering unit 235 may generate a second image by rendering second tiles via rasterization. The ray tracing rendering unit 240 generates a first image by rendering first tiles via ray tracing that uses geometric information stored in the GPU internal memory 250.

The rendering unit 230 creates a final image by merging the first and second images together. The rendering unit 230 then outputs the final image to a frame buffer 575. The frame buffer 575 stores an image of a tile in the form of a pointer.

According to an exemplary embodiment, ray tracing rendering is performed in a separate device, but is not limited thereto. Shading and ray tracing may be performed together in a shader.

Figure 6:
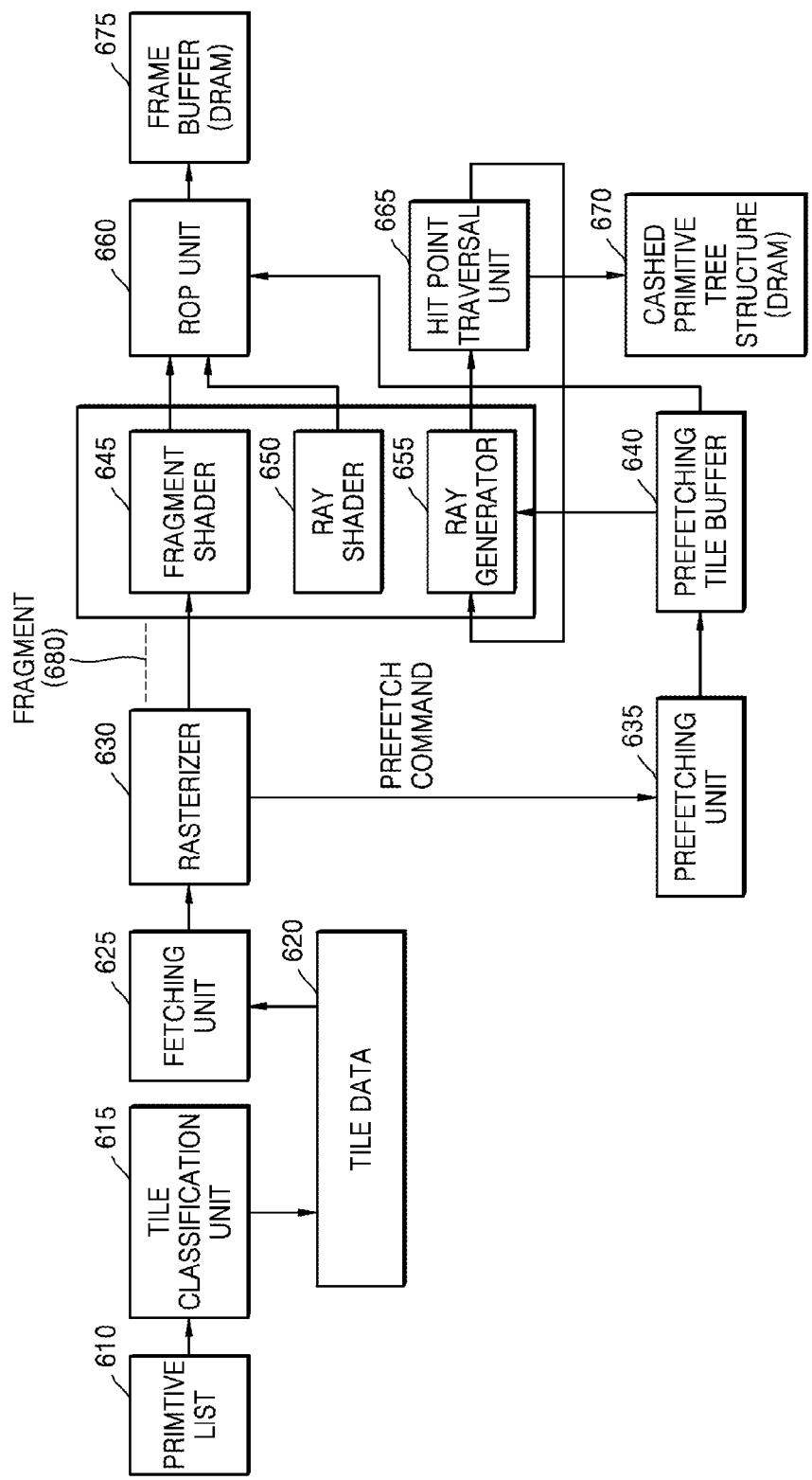
FIG. 6 is a block diagram of another detailed example of the hybrid rendering apparatus of FIG. 5.

FIG. 6 is a block diagram of another example of a hybrid rendering apparatus of FIG. 5.

Thus, although omitted hereinafter, the above descriptions with respect to the hybrid rendering apparatus 200 of FIG. 5 are applied to a hybrid rendering apparatus of FIG. 6.

When a primitive list 610 is input to a tile classification unit 615, the tile classification unit 615 generates tile data 620 by extracting properties of primitives in each tile and classifying tiles, each including at least one primitive having reflective or transparent properties, as first tiles. Furthermore, the tile data 620 includes mapping information indicating tiles to which each primitive belongs.

A tile fetching unit 625 fetches tiles from the tile data 620 and outputs the tiles to a rasterizer 630.

The rasterizer 630 converts primitives in the received tiles into fragments 680 and simultaneously issues a prefetch command to a prefetching unit 635. Upon receipt of the prefetch command, the prefetching unit 635 copies a memory block of the first tiles and stores the memory block in a prefetching tile buffer 640 before a ray tracing calculation starts. The memory block being copied includes data necessary for ray tracing rendering, i.e., geometric information of primitives included in the first tile. The geometric information includes one of depth information, a normal vector, and position information of a primitive.

A fragment shader 645 constructs a conventional rasterization-based GPU and generates an image by projecting a 3D model onto a screen as described above.

It may be obvious to those of ordinary skill in the art that a ray shader 650 that is identical to the fragment shader 645 can be generated by copying the fragment shader 645 in order to mix conventional rasterization-based rendering with ray tracing-based rendering. While FIG. 6 shows that the ray shader 650 is separated from the fragment shader 645, the ray shader 650 and the fragment shader 645 may not necessarily be physically separate from each other. Therefore, the ray shader 650 and the fragment shader 645 may be the same or share various modules with each other.

A ray generator 655 acquires information about an origin and a direction of a ray by using the ray shader 650 and then generates a primary ray having the origin and the direction. After generating the primary ray, the ray generator 655 calculates a hit point using geometric information stored in the prefetching tile buffer 640 and generates a secondary ray using the calculated hit point.

A hit point traversal unit 665 calculates a hit point via a tree traversal routine by using a cached primitive tree structure 670 such as K-dimensional tree (KD-tree) and Bounding Volume Hierarchy (BVH) that represents relationships between objects in a 3D space.

A ROP unit 660 performs a depth test of primitives in tiles that have undergone rasterization-based rendering and ray tracing-based rendering to determine visibility (front-to-back) relations between the tiles. The ROP unit 660 then creates a final rendered image and outputs the final rendered image to a frame buffer 675.

Figure 7:
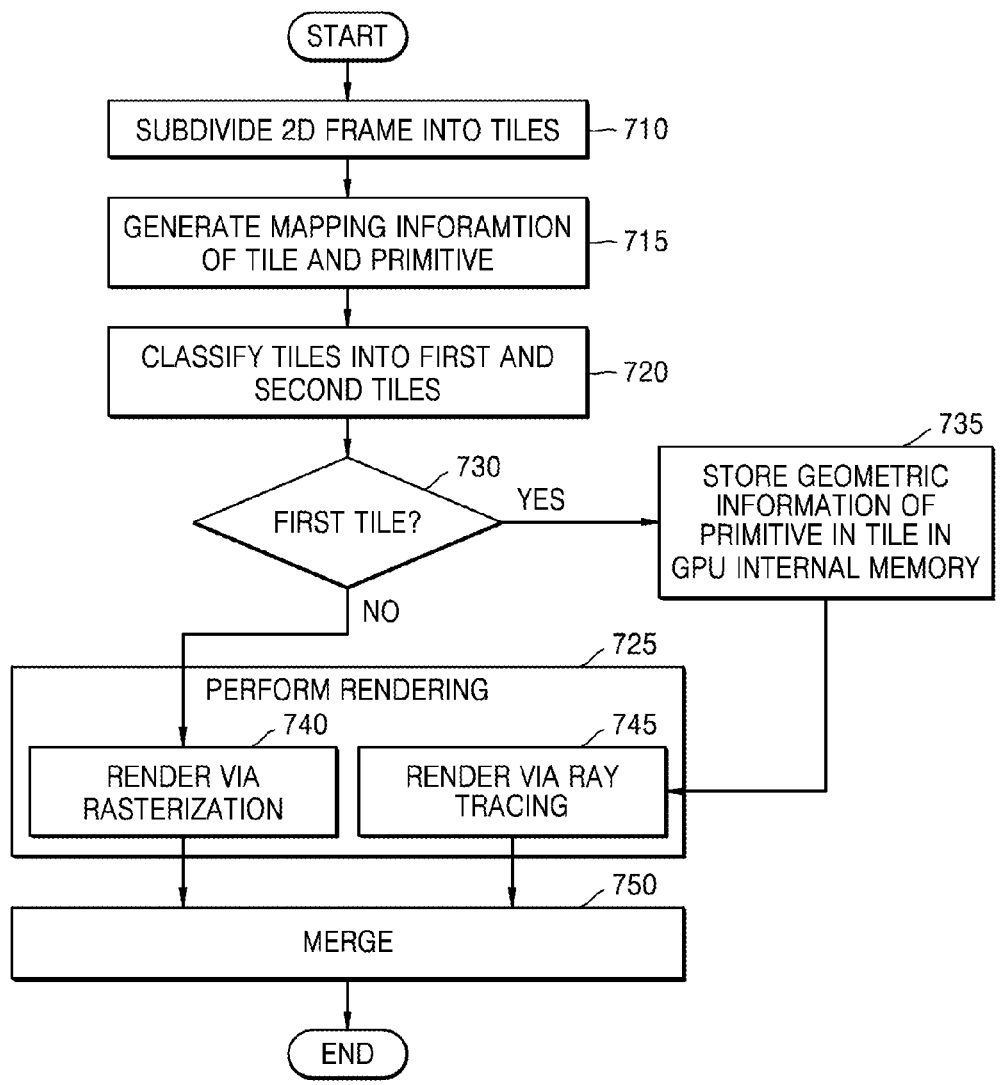
FIG. 7 is a flowchart of a hybrid rendering method according to an embodiment.

FIG. 7 illustrates a flowchart of a hybrid rendering method according to an embodiment.

FIG. 7 illustrates another example of the hybrid rendering method performed by the hybrid rendering apparatus 200 of FIG. 2. Thus, although omitted hereinafter, the above descriptions with respect to the hybrid rendering apparatus 200 of FIG. 2 are applied to the hybrid rendering method of FIG. 7.

Referring to FIGS. 2 and 7, the hybrid rendering apparatus 200 subdivides the 2D frame (310 in FIG. 3) into virtual tiles (hereinafter, referred to as 'tiles') (operation 710). The 2D frame 310 may be a display region or 2D image, but is not limited thereto. The tiles are output in order to proceed to operations 715 and 720.

The hybrid rendering apparatus 200 generates information about mapping between tiles and primitives by performing binning to determine a tile in which each primitive in an object is included from among the tiles obtained in operation 710 (operation 715).

The hybrid rendering apparatus 200 determines whether each of the tiles is a first tile including an object having reflective or transparent properties or a second tile not including an object having reflective or transparent properties, by using the information about mapping between tiles and primitives generated in operation 715 (operation 720).

In operation 720, the hybrid rendering apparatus 200 may extract properties of primitives in tiles and classify a tile including at least one primitive having one of a reflectivity and a refractive index greater than 0 as a first tile by using the properties of primitives. The properties of primitives include material properties such as reflectivities and refractive indices thereof, but are not limited thereto.

In order to extract properties of a list of primitives in a tile, the hybrid rendering apparatus 200 acquires the list of primitives by using the information about mapping between tiles and primitives generated in operation 715. A tile may be classified as a first or second tile by using a flag such as a Boolean value. Alternatively, a tile may be classified by creating a field such as a "tile type" in identification (ID) information of the tile and specifying the field as a character string. In one exemplary embodiment, the hybrid rendering apparatus 200 creates a first tile group including one or more first tiles and a second tile group including one or more second tiles in order to manage tiles. The first and second tiles may denote tiles in the first tile group and in the second tile group, respectively.

In operation 730, the hybrid rendering apparatus 200 outputs ID information of tiles classified as the first tiles in operation 720 in order to proceed to operation 735. The hybrid rendering apparatus 200 also outputs ID information of tiles classified as the second tiles in operation 720 to proceed to operation 740.

Before initiating rendering via ray tracing (operation 745), the hybrid rendering apparatus 200 stores geometric information of primitives in the first tiles, which is needed for ray tracing rendering, in the GPU internal memory 250 (operation 735).

Geometric information needed for ray tracing rendering is stored in a GPU external memory, and the hybrid rendering apparatus 200 fetches geometric information stored in the GPU external memory and copies the geometric information into the GPU internal memory 250. The GPU internal memory 250 includes a SRAM or cache memory, and also includes an on-chip buffer but is not limited thereto. The geometric information includes one of depth information, a normal vector, and position information of a primitive but is not limited thereto.

In operation 735, the hybrid rendering apparatus 200 outputs the first tiles in order to proceed to operation 745.

The hybrid rendering apparatus 200 performs rasterization rendering and ray tracing rendering according to whether tiles are classified as first or second tiles (operation 725)

The hybrid rendering apparatus 200 generates a second image by rendering the second tiles via rasterization (operation 740). The second image is then output in order to proceed to operation 750.

The ray tracing rendering unit 240 generates a first image by rendering the first tiles via ray tracing using the geometric information copied into the GPU internal memory 250. The first image is output in order to proceed to operation 750.

The hybrid rendering apparatus 200 generates a final image by merging together the first and second images generated in operation 740 and 745, respectively.

Figure 8:
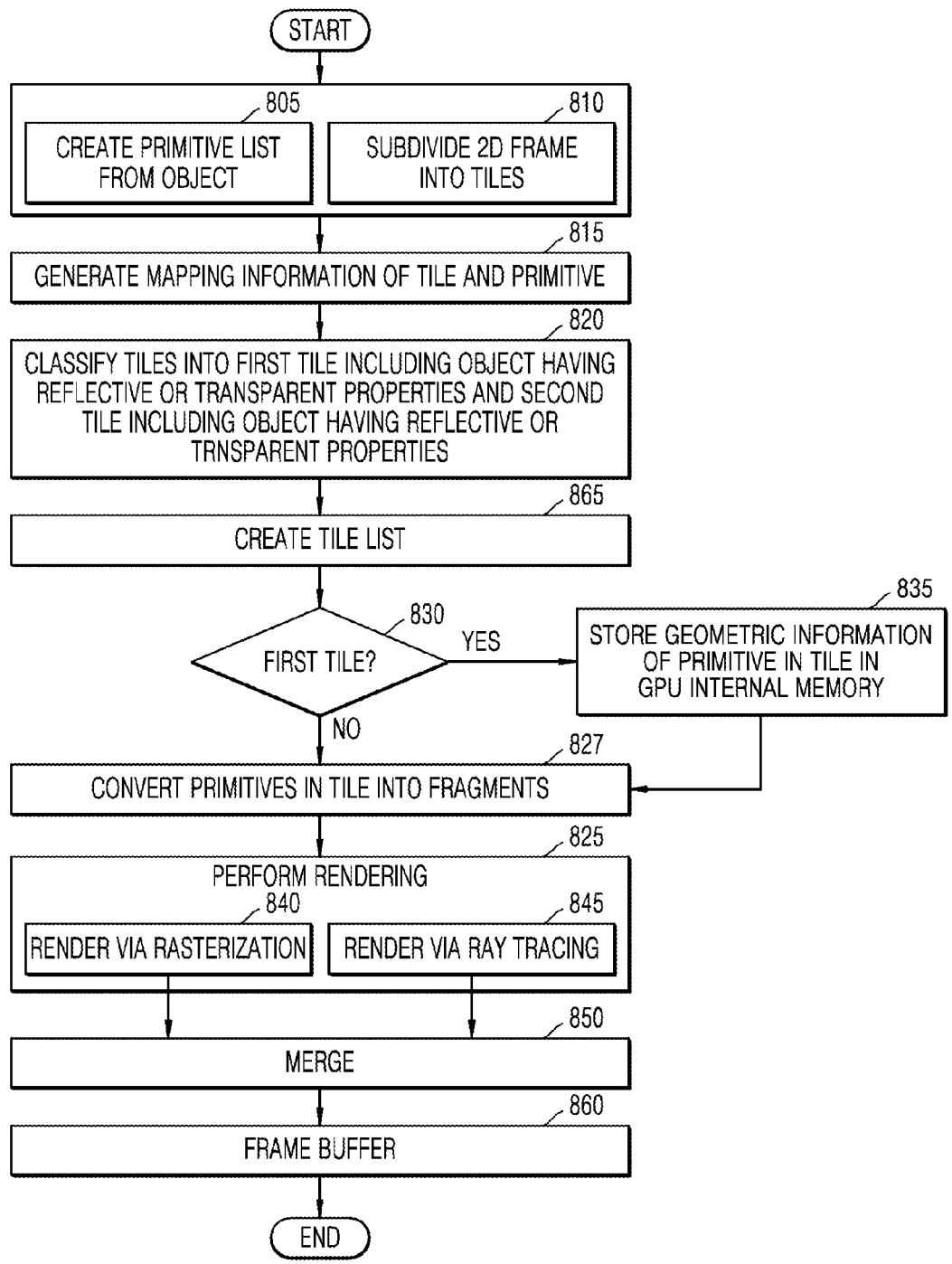
FIG. 8 is a flowchart of a hybrid rendering method according to an embodiment.

FIG. 8 is a flowchart of a hybrid rendering method that combines ray tracing and rasterization, according to an embodiment.

FIG. 8 illustrates an example of the hybrid rendering method of FIG. 7 which is performed by the hybrid rendering apparatus of FIG. 5. Since operations 810, 815, 820, 825, 830, 835, 840, 845, and 850 are substantially the same as operations 710, 715, 720, 730, 735, 740, and 750, respectively, the same descriptions as already presented with respect to FIG. 7 are omitted.

Referring to FIGS. 5 and 8, the hybrid rendering apparatus 200 creates a list of primitives from the object 510 (operation 805).

The hybrid rendering apparatus 200 creates a tile list 535 including mapping information generated in operation 815 and classification information generated in operation 820 (operation 865). For example, the tile list 535 includes ID information of each tile, and the ID information of each tile may include a unique ID for identifying the tile, information about whether the tile is classified as a first tile, and a list of primitives included in the tile. The tile list 535 also includes coordinate information of a vertex of each primitive and property information of each primitive.

The hybrid rendering apparatus 200 reads the tile list 535 created in operation 865 to convert primitives in a tile into fragments (operation 827).

Before starting rendering via ray tracing (operation 845), the hybrid rendering apparatus 200 stores geometric information of the primitives in the first tile, which is necessary for the ray tracing rendering, in the GPU internal memory 250. Although FIG. 8 shows that operation 835 precedes operation 827, as described above, the geometric information may be stored in the GPU internal memory 565 at any time before the ray tracing rendering starts in operation 845.

According to an embodiment, rendering is performed using a deferred rendering technique. As described above, to perform shading on only fragments that are actually rendered on a screen, deferred rendering includes a first stage of storing geometric information of an object in a 3D space and a second stage of performing rendering by using the geometric information stored in the first stage. Thus, before ray tracing rendering starts, the geometric information of the primitives in a first tile, which is stored in the first stage, is fetched from the buffer 440 and copied into the GPU internal memory 250.

Operations 827 and 835 may be performed simultaneously, but are not limited thereto. The geometric information is copied into the GPU internal memory 565 at any time before generation of a secondary ray for a fragment to be rendered.

The hybrid rendering apparatus 200 outputs first and second images generated in operations 840 and 845, respectively, in order to proceed to operation 850. The hybrid rendering apparatus 200 outputs a final image obtained by merging the first and second images in order to proceed to operation 860. The frame buffer 575 stores a pointer indicating an address where an image of a tile is stored.

Hybrid rendering methods according to the exemplary embodiments may be embodied as a computer-readable code on a non-transitory computer-readable storage medium. The non-transitory computer-readable storage medium is any data storage device that can store data which can be thereafter read by a computer system. Examples of non-transitory computer-readable storage media include read-only memory (ROM), random-access memory (RAM), CD-ROMs, magnetic tapes, floppy disks, optical data storage devices, and carrier waves such as transmission through the Internet. The non-transitory computer-readable storage media can also be distributed over network coupled computer systems so that computer-readable codes are stored and executed in a distributed fashion.

Methods, processes, devices, products and/or systems according to the present inventive concept are cost-effective, not complicated, very diverse, and accurate. Furthermore, manufacturing, applications and utilization may be implemented in an immediately available, efficient, and economical manner by applying known components to the processes, devices, products, and systems according to the present inventive concept. Another significant aspect of the present inventive concept is to satisfy current demands for cost reductions, system simplification, and performance improvement. Such advantages of the exemplary embodiments may eventually enhance the current technology levels.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A hybrid rendering method comprising:
subdividing a two-dimensional (2D) frame into tiles;
classifying the tiles into first tiles comprising an object having reflective or transparent properties and second tiles lacking the object having the reflective or transparent properties;
storing geometric information of a primitive in the first tiles in a graphics processing unit (GPU) internal memory; and
generating a first image by rendering one or more of the first tiles via ray tracing using the geometric information of the primitive of the first tiles, generating a second image by rendering one or more of the second tiles via rasterization, and outputting a final image by merging the first and second images,
wherein the classifying of the tiles comprises:
extracting properties of primitives in the tiles; and
determining, among the tiles, a tile including a primitive having one of a reflectivity and a refractive index greater than 0 as the first tile, by using the extracted properties of the primitives,
wherein the extracting of the properties of the primitives in the tiles comprises:
performing binning to determine a tile in which each of the primitives is included from among the tiles;
generating information about mapping between the respective tiles and the primitives; and
acquiring list of the primitives in each of the tiles by using the mapping information, to extract properties of the primitives in the list of primitives.

2. The hybrid rendering method of claim 1, wherein the geometric information of the primitive of the first tiles comprises any one or any combination of depth information, a normal vector, and position information of the primitive of the first tiles.

3. The hybrid rendering method of claim 1, further comprising:
storing the geometric information of the primitive of the first tiles;
fetching the geometric information of the primitive of the first tiles from a graphics processing unit (GPU) external memory; and
copying the fetched geometric information into the GPU internal memory.

4. The hybrid rendering method of claim 3, wherein the geometric information of the primitive of the first tiles comprises any one or any combination of depth information, a normal vector, and position information of the primitive, and wherein the GPU external memory is a G-buffer.

5. The hybrid rendering method of claim 1, further comprising:
creating a tile list comprising a classification result; and
converting a primitive of the first tiles into a fragment by reading the tile list,
wherein the classification result is used in the storing of the geometric information of the primitive.

6. A hybrid rendering apparatus comprising:
a tile subdivision unit configured to subdivide a two-dimensional (2D) frame into tiles;
a tile classification unit configured to classify the tiles into first tiles comprising an object having reflective or transparent properties and second tiles lacking the object having reflective or transparent properties; and
a rendering unit configured to generate a first image by rendering one or more of the first tiles via ray tracing using geometric information of a primitive of the first tiles, to generate a second image by rendering one or more of the second tiles via rasterization, and to output a final image by merging the first and second images,
wherein the tile classification unit extracts properties of primitives in the tiles and determines, among the tiles, a tile including a primitive having one of a reflectivity and a refractive index greater than 0 as the first tile by using the extracted properties of the primitives,
wherein the tile classification unit comprises:
a mapping unit configured to perform binning to determine a tile in which each of the primitives is included from among the tiles and to generate information about mapping between the respective tiles and the primitives; and
a determination unit configured to acquire a list of the primitives in each of the tiles by using the mapping information, extract properties of the primitives in the list of primitives, and to determine, among the tiles, a tile including one primitive having one of a reflectivity and a refractive index greater than 0 as the first tile, by using the properties of the primitives.

7. The hybrid rendering apparatus of claim 6, wherein the geometric information of the primitive of the first tiles comprises any one or any combination of depth information, a normal vector, and position information of the primitive of the first tiles.

8. The hybrid rendering apparatus of claim 6, wherein the rendering via ray tracing is performed together with shading in a device for performing the shading.

9. The hybrid rendering apparatus of claim 6, further comprising:
a fetching unit configured to store the geometric information of the primitive in the first tiles in a graphics processing unit (GPU) internal memory and to fetch the geometric information of the primitive in the first tiles from a GPU external memory and copy the fetched geometric information into the GPU internal memory.

10. The hybrid rendering apparatus of claim 9, wherein the geometric information of the primitive of the first tiles comprises any one or any combination of depth information, a normal vector, and position information of the primitive, and wherein the GPU external memory is a G-buffer.

11. The hybrid rendering apparatus of claim 9, further comprising a rasterizer,
wherein the tile classification unit creates a tile list comprising a classification result,
wherein the rasterizer converts a primitive of the first tiles into a fragment by reading the tile list, and
wherein the fetching unit uses the classification result contained in the tile list.

12. A non-transitory computer-readable storage medium storing instructions that, when executed by a processor, cause the processor to perform the method of claim 1.

13. A hybrid rendering method comprising:
subdividing a two-dimensional (2D) frame into tiles;
generating mapping information of the tiles and primitives included in the tiles;
classifying the tiles into first tiles and second tiles based on a characteristic of the primitives included in the tiles;

storing geometric information of primitives included in the first tiles in a graphics processing unit (GPU) internal memory;

performing rendering of the first tiles via ray tracing based on the geometric information of the primitives included in the first tiles thereby generating a first image and performing rendering via rasterization of the second tiles thereby generating a second image; and outputting a final image by merging the first and the second images, wherein the classifying of the tiles comprises:

extracting properties of primitives in the tiles; and determining, among the tiles, a tile including a primitive having one of reflectivity and a refractive index greater than 0 as the first tile, by using the extracted properties of the primitives, wherein the extracting of the properties of the primitives in the tiles comprises:

performing, binning, to determine a tile in which each of the primitives is included from among the tiles;

generating information about mapping between the respective tiles and the primitives; and acquiring a list of the primitives in each of the tiles by using the mapping information, to extract properties of the primitives in the list of primitives.

14. The hybrid rendering method of claim 13, wherein the tiles are classified into the first tiles by determining whether the first tiles include at least one primitive having one of a reflectivity and a refractive index greater than 0.

15. A non-transitory computer-readable storage medium storing instructions that, when executed by a processor, cause the processor to perform the method of claim 13.

16. A hybrid rendering apparatus, comprising:

a processor configured to:

subdivide a two-dimensional (2D) frame into tiles;

classify the tiles into first tiles comprising an object having reflective or transparent properties and second tiles lacking the object having reflective or transparent properties; and generate a first image by rendering one or more of the first tiles via ray tracing using geometric information of a primitive of the first tiles, to generate a second image by rendering one or more of the second tiles via rasterization, and to output a final image by merging the first and second images, wherein, to classify the tiles into the first tiles, the processor is configured to extract properties of primitives in the tiles and determine, among the tiles, a tile including a primitive having one of a reflectivity and a refractive index greater than 0 as the first tile by using the extracted properties of the primitives, wherein, to extract the properties of primitives in the tiles, the processor is configured to perform binning to determine a tile in which each of the primitives is included from among the tiles, generate information about mapping between the respective tiles and the primitives and acquire a list of the primitives in each of the tiles by using the mapping information, to extract properties of the primitives in the list of primitives.

17. A hybrid rendering apparatus, wherein the processor comprises:

a tile subdivider configured to subdivide a two-dimensional (2D) frame into tiles;

a tile classifier configured to classify the tiles into first tiles comprising an object having reflective or transparent properties and second tiles lacking the object having reflective or transparent properties; and a renderer configured to generate a first image by rendering one or more of the first tiles via ray tracing using geometric information of a primitive of the first tiles, to generate a second image by rendering one or more of the second tiles via rasterization, and to output a final image by merging the first and second images, wherein the tile classifier is configured to extract properties of primitives in the tiles and determine, among the tiles, a tile including a primitive having one of a reflectivity and a refractive index greater than 0 as the first tile by using the extracted properties of the primitives, wherein, to extract the properties of primitives in the tiles, the tile classifier is configured to perform binning to determine a tile in which each of the primitives is included from among, the tiles, generate information about mapping between the respective tiles and the primitives and acquire a list of the primitives in each of the tiles by using the mapping information, to extract properties of the primitives in the list of primitives.

* * * * *